March 13, 1956 W. A. REICH 2,738,086
HAND TRUCK FOR HANDLING BANANA BUNCHES
Filed May 11, 1953
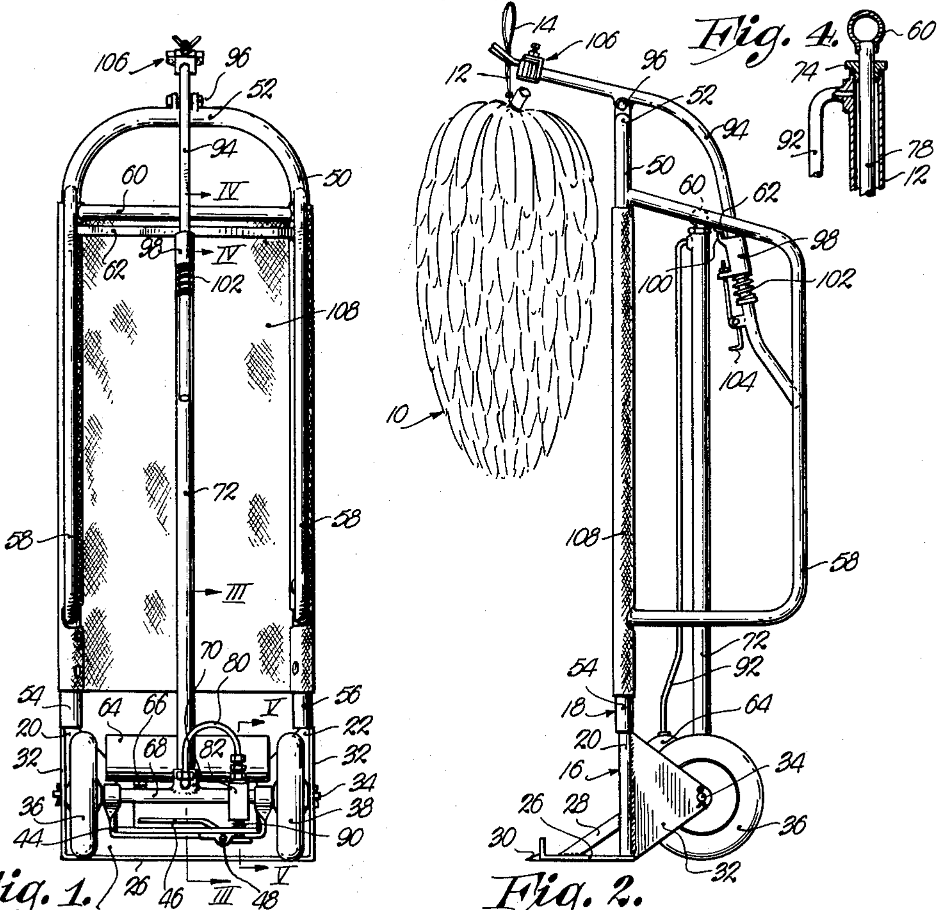
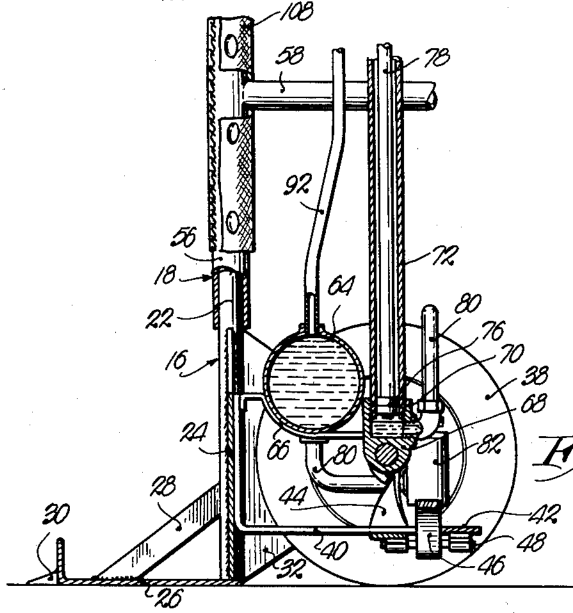
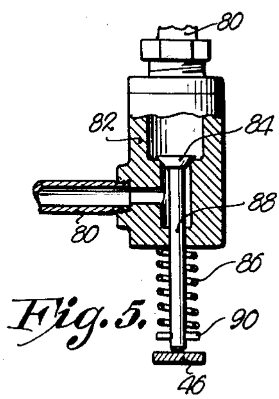
INVENTOR.
Walter A. Reich
BY
ATTORNEY.

United States Patent Office 2,738,086

Patented Mar. 13, 1956

2,738,086

HAND TRUCK FOR HANDLING BANANA BUNCHES

Walter A. Reich, Kansas City, Mo., assignor to A. Reich & Sons, Inc., Kansas City, Mo., a corporation of Missouri

Application May 11, 1953, Serial No. 354,275

2 Claims. (Cl. 214—513)

This invention relates to improvements in banana handling equipment and has for its primary object the provision of a novel hand truck capable of receiving and moving a stalk of bananas without necessitating manual handling of the stalk in any way whatsoever, thereby providing a tremendous saving in physical energy and substantial saving in losses due to damage to the bananas caused by the conventional manner of manual handling thereof.

This is a continuation-in-part of my copending application, Serial No. 287,289, filed May 12, 1952, and now abandoned, wherein it was pointed out that stalks of bananas must necessarily be handled a large number of times at the point of shipment and prior to actual delivery to the retailer, and that as a result thereof losses due to damage of the bananas themselves during such handling were heretofore charged off as a necessary and unavoidable expense. Furthermore, as fully explained in my co-pending application, such manual handling of the banana bunches is a tiresome task and wholesalers generally have been confronted with the problem of keeping employees willing to do that type of work.

There is disclosed therefore, in the said copending application, a novel grappling hook mounted on a suitable cart or truck and capable of automatically grasping the tie rope that is placed upon each stalk of bananas at the point of shipment from the plantation.

It is the most important object of the present invention to provide a hand truck adapted for mounting and use with the grappling hook of said co-pending application for facilitating additionally the carrying of the banana stalk from point to point in and about the wholesale warehouse.

Another important object of the present invention is to provide a mobile hand truck that includes a pair of relatively shiftable frames, together with releasable means for holding one of the frames against descent with respect to the other frame, all to the end that the grappling hook mounted thereon may be moved to and from a position adjacent the tie rope on the banana stalk.

Another object of this invention is to provide a hand truck wherein the releasable means aforementioned for holding one of the frames in a predetermined elevated position, takes the form of hydraulic mechanism permitting quick and easy raising of the shiftable frame, together with simple means for quickly releasing the shiftable frame when it is desired that the same be lowered on the primary mobile frame.

A still further object of this invention is to provide in a hand truck having shiftable framework, together with hydraulic control means therefor, a swingable arm for receiving the grappling hook which may be swung after the grappling hook grasps the tie rope of the banana stalk to raise the stalk from a support upon which it is suspended so that the operator may thereupon move the stalk to another location without handling the stalk manually in any way whatsoever.

Other important objects of the present invention include the way in which the swingable arm is releasably locked to a secondary frame upon which it is swingably mounted; the way in which the secondary frame is telescoped on a primary frame for vertical reciprocable movement, the primary frame being rendered mobile through a wheel and axle assembly; the way in which the secondary frame is attached to a reciprocable piston forming a part of the hydraulic mechanism so that hydraulic fluid is drawn into a cylinder within which the piston is mounted as the secondary frame is raised on the primary mobile frame; the way in which the piston displaces air within the cylinder and discharges the same to a tank containing hydraulic liquid so as to increase the pressure therewithin and aid the piston in drawing the liquid into the cylinder; the manner in which a manually controlled, spring-loaded check valve is provided in the hydraulic system to permit lowering of the secondary frame simply by stepping upon a foot pedal; and many other more minor objects, all of which will be made clear as the following specification progresses.

In the drawing:

Figure 1 is a rear elevational view of a hand truck with hydraulic mechanism for handling bunches of bananas made pursuant to the present invention.

Fig. 2 is a side elevational view thereof showing a stalk of bananas attached thereto.

Fig. 3 is an enlarged, fragmentary, detailed, cross-sectional view taken on line III—III of Fig. 1 looking in the direction of the arrows.

Fig. 4 is an enlarged, fragmentary, detailed, cross-sectional view taken on line IV—IV of Fig. 1; and Fig. 5 is an enlarged, fragmentary, detailed, cross-sectional view taken on line V—V of Fig. 1.

A stalk of bananas 10 is illustrated in Fig. 2 of the drawing and it is seen that the same is provided with a tie rope 12 in the usual manner, and which is employed by virtue of a loop 14 therein for suspending the stalk 10 in any desired location. In this respect the bananas must be removed from the refrigerator cars at the point of receipt by the wholesaler and placed in ripening chambers. Such chambers are usually refrigerated and provided with hook means depending from the ceiling thereof for receiving the stalks 10 in suspended relationship thereto. The workman must normally carry the stalk 10 by encircling the same with his arms and thereupon place the loop 14 over a hook within the ripening chamber. Oftentimes the bananas are moved from chamber to chamber as ripening progresses and each time the same must be handled manually and carried from place to place in the manner just described. It is impossible to prevent damage to the bananas particularly after they become ripe or partially ripened since a rather firm grip must be had on the bunch in order to permit manipulation of the rope 12 with respect to the overlying supports therefor.

The hand truck hereof is designed to overcome all of the aforementioned problems and includes a primary frame broadly designated by the numeral 16, and a secondary frame 18. Frame 16 includes a pair of spaced, normally vertical standards 20 and 22 interconnected at the lowermost end thereof by a plate 24. An L-shaped base 26 extends forwardly from the plate 24 to which it is affixed, and is joined with the standards 20 and 22 by braces 28. A pair of spaced, anti-slip prongs 30 on the base 26 extend forwardly therefrom.

A pair of spaced gussets 32 secured to the standards 20 and 22 and extending rearwardly therefrom, journal an axle 34 that in turn receives a pair of wheels 36 and 38.

A pair of L-shaped brackets 40, secured to the plate 24, are joined by a cross-piece 42 and are additionally supported by a U-shaped strap 44 secured to the axle 34. A foot pedal 46 is swingably mounted on the cross-pieces 42 and the strap 44 by a hinge pin 48.

The secondary frame 18 includes a U-shaped member 50 having a bight 52 and a pair of spaced, tubular legs 54 and 56 telescoped over the standards 20 and 22 respectively for free vertical sliding movement thereon. Each leg 54 and 56 is provided with a substantially U-shaped, rearwardly extending handle bar 58 rigid thereto, and the handle bars are joined by a pair of cross-members 60 and 62 adjacent the uppermost end thereof, the cross bar 62 being L-shaped in cross-section as shown in Fig. 2.

Hydraulic mechanism is provided for controlling the relative movement of the frames 16 and 18 and such mechanism includes a liquid-receiving tank 64 carried by the frame 16 through the medium of a support 66 interconnecting the bracket 40 and the axle 34. A sleeve 68 on the axle 34 between the wheels 36 and 38, and which receives the strap 44 and the support 66, has an upstanding coupling 70 midway between the ends thereof that receives an elongated, upstanding cylinder 72 that terminates immediately below the cross member 60 as shown in Figs. 2 and 4, and is provided with a perforated sealing plug 74 at its uppermost end. A vertically reciprocable piston 76 in the cylinder 72 is joined to the lowermost end of a piston rod 78 within the cylinder 72. Rod 78 extends through the plug 74 as shown in Fig. 4 and is joined directly to the cross pieces 60 midway between the ends of the latter.

A conduit 80 communicating with the tank 64 at the bottom thereof and with the coupling 70 as shown in Fig. 3, has a valve body 82 interposed therein that is in turn provided with a vertically reciprocable check valve 84. Valve 84 is held normally closed as shown in Fig. 5 by a spring 86 coiled about its stem 88 and interposed between the valve body 82 and a stop 90 on the stem 88. Stem 88 is in direct overlying relationship to the foot pedal 64 as is clear in Figs. 1 and 5. Cylinder 72 is joined at its uppermost end with the tank 64 at the top of the latter by a tube 92.

An arm 94 overlying the bight 52 and swingably secured thereto by a pivot pin 96 overlies the cross members 60 and 62 between the handle bars 58, and is normally locked against swinging movement by joinder with the cross member 62. A spring-loaded latch 98 reciprocable on the arm 94, has a hook 100 engageable with the cross piece 62 and is yieldably biased toward the latter by a spring 102 on the arm 94. A finger control 104 pivotally secured to the arm 94 and joined with the latch 98 is depressible toward the arm 94 to release the latch 98 against the action of spring 102 and from engagement with the cross member 62.

A grappling hook, broadly designated by the numeral 106, is mounted on the uppermost end of the arm 94 and is adapted to receive and grasp the rope 12. The details of construction of the hook 106 are fully disclosed and claimed in my co-pending application above-identified and since the same forms no part of the present invention, no detailed showing has been made thereof. It may be pointed out however, that the grappling hook 106 may be moved to a position for receiving the rope 12 and that it grasps the rope 12 in response to the weight of the bananas 10. As soon as the weight is removed from the jaws of the grappling hook 106, it will release its hold on the rope 12.

The legs 54 and 56 of the secondary frame 18 are interconnected throughout substantially the entire length thereof by an apron 108 of flexible material such as canvas. Assuming the bunch of bananas 10 to be suspended from a hook on the ceiling of a cold storage ripening chamber, the operator, by grasping the handles 58, rolls the hand truck upon the wheels 36 and 38 to a position adjacent the suspended bunch of bananas 10. He thereupon, permits the truck to rest upon the base 26 as shown in Fig. 2, and while grasping the handles 58, raises the secondary frame 18 with respect to the frame 16. The piston 76 is thereby pulled upwardly in the cylinder 72 by the rod 78 to draw hydraulic fluid from the tank 64, past the valve 84 that yields upwardly by virtue of the spring 86, and into the cylinder 72 below the piston 76. Simultaneously, the rising piston 76 will displace air thereabove out of the cylinder 72 and force the air into the tank 64 upon the level of liquid therein by way of tube 92. Such increase of pressure within the tank 64 will facilitate the piston 76 in causing flow of the liquid from tank 64 through the conduit 80 and past the valve 84. After the grappling hook 106 has been raised to a position adjacent the rope 12, continued upward movement of the frame 18 is discontinued and the frame 18 is supported and held against descent relative to the frame 16 by the piston 76 resting upon the fluid in the cylinder 72, which in turn is supported by valve 84 that is held closed by spring 86.

The operator thereupon releases the latch 98 and swings the arm 94 outwardly away from the cylinder 72 and moves the truck to position the grappling hook 106 to a point where it will receive the rope 12. He thereupon swings the arm 94 to the position shown in Fig. 2 of the drawing and latches the same in place in engagement with the cross member 62. Such downward swinging movement of the arm 94 raises the grappling hook 106 into grasping relationship to the rope 12 and also raises the bunch of bananas 10 to a point where the loop 14 may be easily removed from its supporting hook.

The operator thereupon grasps the handles 58 and tips the truck rearwardly on the wheels 36 and 38 and the bananas 10 will swing to a position resting upon the flexible apron 108. The operator may then roll the truck with the bananas 10 carried thereby to any desired position such as to another ripening room or overhead conveyor, at which point the loop 14 may be easily positioned over another supporting hook. By releasing the latch 98 and swinging of the arm 94 upwardly, the grappling hook 106 moves downwardly along the rope 12 and releases its grip thereon.

If, on the other hand, it is desired to lower the frame 18, it is but necessary for the operator to step upon the pedal 46 to raise the check valve 84 against the action of spring 86. The weight of the secondary frame 18 moves the piston 76 downwardly and forces the fluid from the cylinder 72, back into the tank 64 through the conduit 80. Air in the tank 64 will be displaced back into the cylinder 72 above the piston 76 through tube 92. The descent of the bunch of bananas 10 and the secondary frame 18 is smooth and progressive and it is not necessary for the operator to maintain his hold upon the handles 58 to prevent a rapid jarring descent that might tend to dislodge the stalk of bananas from the grappling hook 106 or damage the same.

Having thus described the invention what is claimed as new and desired to be secured by Letters Patent is:

1. In a hand truck, a primary, normally upright, mobile frame; a secondary, article-supporting frame mounted on the mobile frame for vertical reciprocation; an upright cylinder secured to the primary frame; a rod secured to the secondary frame and extending into the uppermost end of the cylinder; a liquid tank; a conduit placing the tank into communication with the cylinder at the lowermost end of the latter; a piston secured to the rod within the cylinder for drawing liquid from the tank, through the conduit, and into the cylinder upon raising of the secondary frame relative to the primary frame; a releasable check valve in the conduit for holding the liquid in the cylinder whereby the liquid supports the secondary frame; and a tube joining the tank and the cylinder at said uppermost end of the latter for raising the pressure on the liquid in the tank as the piston rises in the cylinder and displaces air in the latter above the piston.

2. In a hand truck as set forth in claim 1 wherein said check valve is provided with a spring-loaded, shiftable stem, and wherein is provided a foot pedal, swingable on the primary frame and engageable with said stem for shifting the valve to release said liquid from the cylinder for reflow into the tank under force of the piston as the latter descends under influence of the weight of the secondary frame.

References Cited in the file of this patent

UNITED STATES PATENTS

| | | |
|---|---|---|
| 1,820,263 | Williams | Aug. 25, 1931 |
| 2,254,523 | Graves | Sept. 2, 1941 |
| 2,282,652 | Henning | May 12, 1942 |
| 2,369,838 | Minnis | Feb. 20, 1945 |
| 2,386,759 | Ulm | Oct. 16, 1945 |
| 2,514,825 | Zenko | July 11, 1950 |
| 2,545,440 | Barber | Mar. 20, 1951 |
| 2,560,131 | Sasgen et al. | July 10, 1951 |
| 2,620,937 | Halloran | Dec. 9, 1952 |
| 2,644,598 | Winslow | July 7, 1953 |
| 2,650,733 | Blatz | Sept. 1, 1953 |
| 2,682,350 | Garrett | June 29, 1954 |